US008863263B2

(12) United States Patent
Asano et al.

(10) Patent No.: US 8,863,263 B2
(45) Date of Patent: Oct. 14, 2014

(54) SERVER APPARATUS AND PROGRAM FOR SINGLE SIGN-ON

(75) Inventors: Yoshikazu Asano, Yokohama (JP); Noriyuki Sawai, Yokohama (JP); Rie Noda, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 339 days.

(21) Appl. No.: 13/026,573

(22) Filed: Feb. 14, 2011

(65) Prior Publication Data

US 2011/0231920 A1 Sep. 22, 2011

(30) Foreign Application Priority Data

Mar. 18, 2010 (JP) .................................. 2010-062292

(51) Int. Cl.
*G06F 17/40* (2006.01)
*H04L 29/06* (2006.01)
*H04L 29/12* (2006.01)

(52) U.S. Cl.
CPC ....... H04L 63/0815 (2013.01); *H04L 29/12132* (2013.01)
USPC ............ 726/8; 726/1; 726/4; 726/18; 726/19; 713/155; 713/159; 713/168; 713/172; 713/182; 713/183; 713/184; 713/185; 709/203; 709/217; 709/218; 709/219; 709/206; 709/223; 709/224; 709/225; 709/226; 709/227; 709/228; 709/229

(58) Field of Classification Search
CPC ...................... H04L 63/0815; H04L 29/12132; H04L 63/0884; H04L 63/083; G06F 21/41
USPC ............... 726/1–10; 725/4, 82; 709/217–219; 718/107; 719/311
See application file for complete search history.

(56) References Cited

U.S. PATENT DOCUMENTS

| | | | | |
|---|---|---|---|---|
| 5,812,784 | A * | 9/1998 | Watson et al. | 709/227 |
| 6,801,946 | B1 * | 10/2004 | Child et al. | 709/230 |
| 8,006,294 | B2 * | 8/2011 | Kikuchi | 726/8 |
| 8,327,427 | B2 * | 12/2012 | Soukup et al. | 726/8 |
| 2006/0271689 | A1 | 11/2006 | Kikuchi | |
| 2011/0231920 | A1 * | 9/2011 | Asano et al. | 726/8 |
| 2011/0302646 | A1 * | 12/2011 | Ronda et al. | 726/9 |

FOREIGN PATENT DOCUMENTS

| | | |
|---|---|---|
| JP | 2006-107007 | 4/2006 |
| JP | 2006-331044 | 12/2006 |

OTHER PUBLICATIONS

Japanese Office Action issued Dec. 3, 2013 for Japanese Application No. 2010-062292.

* cited by examiner

*Primary Examiner* — Farid Homayounmehr
*Assistant Examiner* — Lizbeth Torres-Diaz
(74) *Attorney, Agent, or Firm* — Staas & Halsey LLP

(57) ABSTRACT

A server apparatus includes an analyzer unit which analyzes log-in information for a server received from a client, determines an authentication scheme of the server, and extracts, from the log-in information, provisional authentication information in a form representative of variable information. The analyzer unit stores, in the storage device, information representative of the authentication scheme and the provisional authentication information as the variable information. The analyzer unit also stores, in the storage device, as the variable information, authentication information of a user for the server that is associated with representative authentication information of the user.

12 Claims, 11 Drawing Sheets

TABLE OF SERVER-SPECIFIC LOG-IN INFORMATION
(1) URL OF TOP WEB PAGE
(2) URL FOR LOG-IN
(3) AUTHENTICATION SCHEME IN WEB SERVER (FORM/BASIC)
(4) SPECIFIC INFORMATION FOR AUTHENTICATION
(5) URL FOR LOG-IN REQUEST
(6) LOG-IN DATA INFORMATION

FIG. 3

TABLE OF SERVER- & USER-SPECIFIC
AUTHENTICATION INFORMATION:
- SERVER/USER IDENTIFICATIONS
(1) REPRESENTATIVE ID & PASSWORD
(2) ID FOR SERVER_m
(3) PASSWORD FOR SERVER_m

FIG. 4A

REFERENCING

TABLE OF SERVER-SPECIFIC VARIABLE INFORMATION:
- SERVER IDENTIFICATION_m
  (/USER IDENTIFICATION)
(1) PROVISIONAL USER ID
(2) PROVISIONAL PASSWORD
(3) OTHER INFORMATION

FIG. 4B

EXAMPLE OF TABLE OF SERVER-SPECIFIC LOG-IN INFORMATION (1) http://sample.fujitsu.com/index.html
(2) http://sample.fujitsu.com/login.html
(3) Form
(4) "input", "", "name", "userID"
    "input", "", "name", "LOG_IN"
    "input", "", "name", "userid"
    "input", "", "name", "password"
    "input", "", "name", "submit"
    "input", "", "name", "action"
(5) http://sample.fujitsu.com/action.html
(6) userid=uid,passwd=password,docID=key1

--- :VARIABLE INFORMATION

FIG. 5A

EXAMPLE OF TABLE OF SERVER-SPECIFIC LOG-IN INFORMATION (1) http://sample.fujitsu.com/index.html
(2) http://sample.fujitsu.com/login.html
(3) Basic
(4)
(5)
(6)

FIG. 5B

EXAMPLE OF
TABLES OF SERVER- & USER-SPECIFIC AUTHENTICATION INFORMATION

EXAMPLE OF
TABLES OF SERVER-SPECIFIC VARIABLE INFORMATION

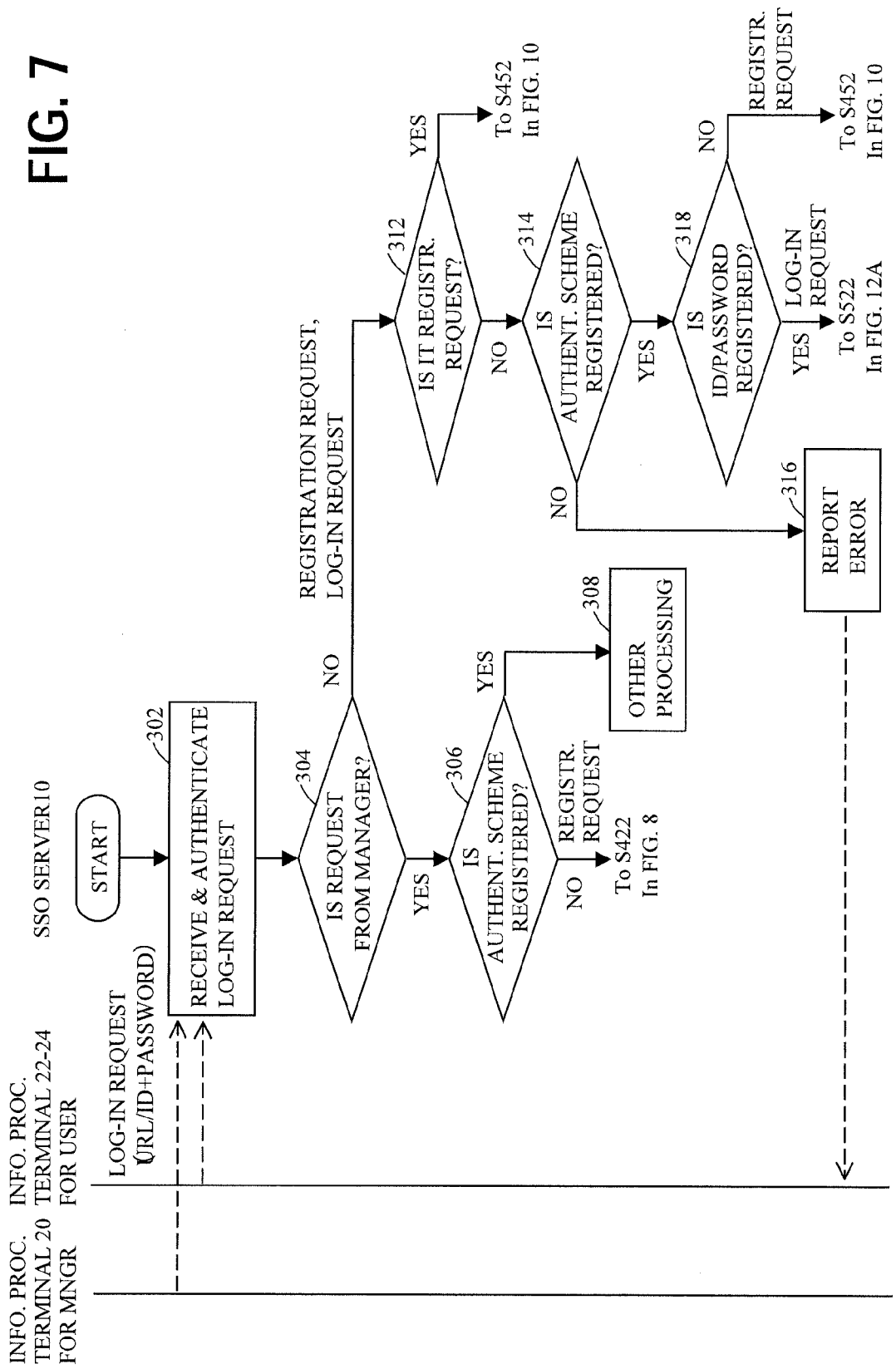

WEB PAGE FOR SINGLE SIGN-ON REGISTRATION SERVICE

SCREEN OF SINGLE SIGN-ON REGISTRATION SERVICE
INPUT ID/PASSWORD

| USER NAME | REPRESENTATIVE ID | PWD |
|---|---|---|
| User_1 | UserID_10 | ****** |
| SERVER NAME | ID | PWD |
| Server_1 | UserID_11 | PWD_11 |
| Server_2 | | |
| Server_3 | | |

FIG. 11

SERVER APPARATUS AND PROGRAM FOR SINGLE SIGN-ON

CROSS-REFERENCE TO RELATED APPLICATION

This application is based upon and claims the benefit of priority of the prior Japanese Patent Application No. 2010-62292, filed on Mar. 18, 2010, the entire contents of which are incorporated herein by reference.

FIELD

A certain aspect of the embodiments discussed herein is related to an operation for a single sign-on service for automatic log in to a server.

BACKGROUND

For registering, with a server for a single sign-on service, a URI (Uniform Resource Identifier) of a target web server or its target application for which the single sign-on service is used, it is necessary to pre-collect necessary information such as an authentication scheme and an IP address of the web server or the application. For this purpose, an operator may need to collect and analyze an entire log file or files of communication between a client and the web server for which the single sign-on service is used, and to analyze information of the URL (Uniform Resource Locator) described in the HTML (HyperText Markup Language) from the web server or the application.

For such analysis, a manager may need to have expertise in an OS (Operating System), database (DB), HTML, HTTP (HyperText Transfer Protocol), or the like, as middleware. In addition, the manager may need to compare messages stored in the log file with messages flowing through a network and analyze them, for each registration of a URI.

A known single sign-on method uses single sign-on modules which store knowledge to implement single sign-on, and a single sign-on server which analyzes log-in communication of an enterprise information system (EIS) and selects and executes an applicable single sign-on module. Thus, the single sign-on may be implemented without having knowledge of a lower-layer technology such as HTTP and HTML. Thus, the single sign-on may be implemented in a short term and at low cost.

SUMMARY

According to an aspect of the embodiment, a server apparatus for allowing a client to log-in to a server via single sign-on includes: a storage device, and an analyzer unit. The analyzer unit analyzes log-in information for the server received from the client, determines an authentication scheme of the server, and extracts, from the log-in information, provisional authentication information in a form representative of variable information. The analyzer unit further stores, in the storage device, information representative of the authentication scheme and the provisional authentication information as the variable information, and stores, in the storage device, as the variable information, authentication information of a user for the server that is associated with representative authentication information of the user.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 illustrates an example of a table of server-specific log-in information stored in a database;

FIGS. 4A and 4B illustrate examples of a table of authentication information specific to a server and specific to a user and of a table of variable information specific to a web server;

FIGS. 5A and 5B illustrate examples of specific tables of server-specific log-in information of FIG. 3 for different authentication schemes (Form and Basic authentications);

FIG. 7 illustrates an example of a flow chart for processing for single sign-on in response to different requests for log-in from the information processing terminals, which is executed by the single sign-on server;

FIG. 11 illustrates an example of a display screen or picture of registration in a single sign-on service.

DESCRIPTION OF EMBODIMENTS

The known single sign-on method needs to compare all of different single sign-on modules with messages flowing through the network in order to implement the automatic log-in. However, the comparison of all of the single sign-on modules with such messages for each log-in may undesirably increase a processing load of a single sign-on (SSO) server as the number of different single sign-on modules increases.

An object of an aspect of the embodiments is to suppress or reduce server load for automatic log-in. Another object of an aspect of the embodiments is to facilitate registration of authentication information for single sign-on.

According to the aspect of the embodiments, server load for automatic log-in can be suppressed or reduced. According to the aspect of the embodiments, registration of authentication information for single sign-on can be facilitated.

Non-limiting preferred embodiments of the present invention will be described with reference to the accompanying drawings. Throughout the drawings, similar symbols and numerals indicate similar items and functions.

Figure 1:
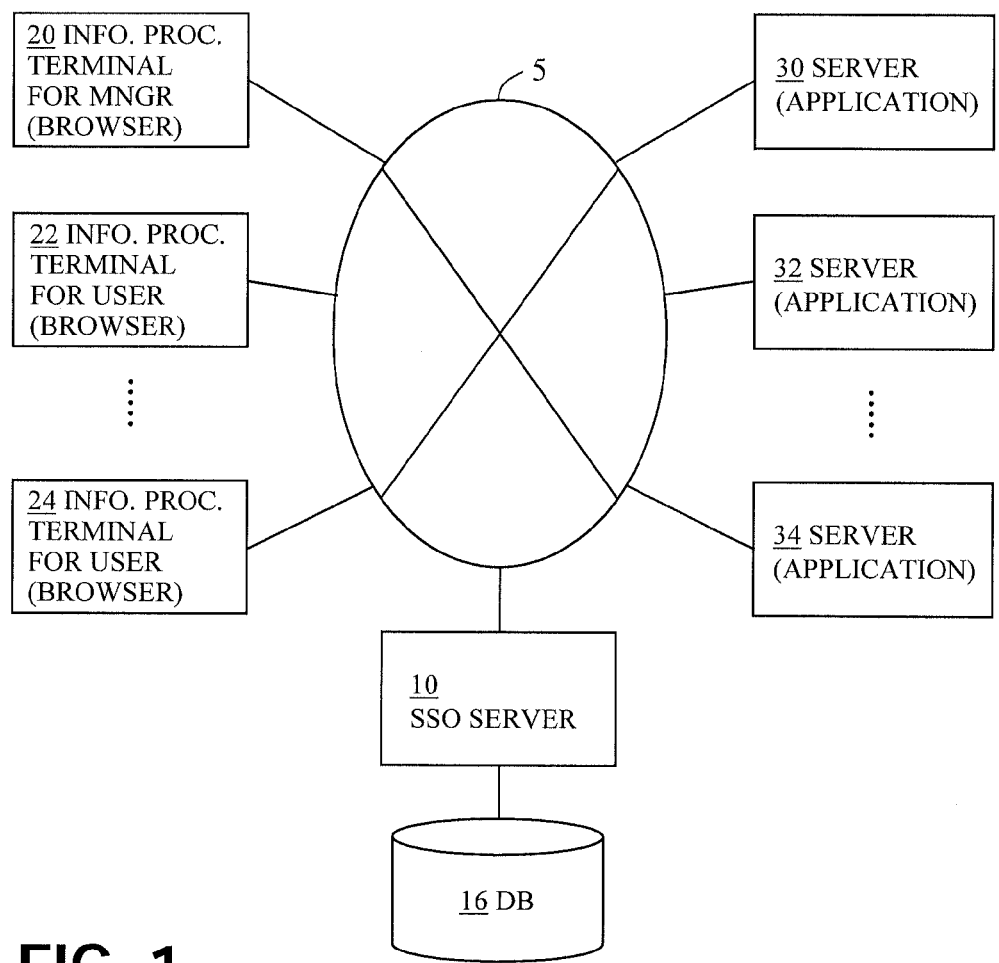
FIG. 1 illustrates an example of connections among a single sign-on (SSO) server, information processing terminals for a manager and users, and web servers, which are interconnected over a network.

FIG. 1 illustrates an example of connections among a single sign-on (SSO) server 10, an information processing terminal 20 for a manager, information processing terminals 22, . . . , and 24 for users, and web servers 30, 32, . . . , and 34, which are interconnected over a network 5. The information processing terminals 20-24 are client machines. A web browser application is implemented on each of processors of the information processing terminals 20-24. In each of the information processing terminals 20-24, each web browser application transmits and receives information to and from the single sign-on server 10 and the web servers 30-34, and displays or presents received information related to URLs (Uniform Resource Locators). Each of the single sign-on server 10 and web servers 30-34 is a server machine as an information processing apparatus. The single sign-on server 10 includes a database (DB) 16. Any of the information processing terminals 22-24 for users may be also used as the information processing terminal 20 for a manager.

The network 5 may include networks, such as the Internet, a cable television (CATV) network, a PSTN (public switched telephone network), mobile communication network, a local area network (LAN), and/or the like. The information processing terminals 20-24 may be personal computers (PCs), mobile telephones, or PDAs (Personal Digital Assistants), for example. Each of the web servers 30-34 includes applications which provide different contents and information processing services to the information processing terminals 22-24 for users.

A user can pre-register, with the single sign-on server 10, pieces of authentication information specific to the user for the respective web servers 30-34 and/or their respective applications. Thus, the user can use only representative authentication information to access the web servers 30-34 and their applications which implement respective different authentications.

Figure 2:
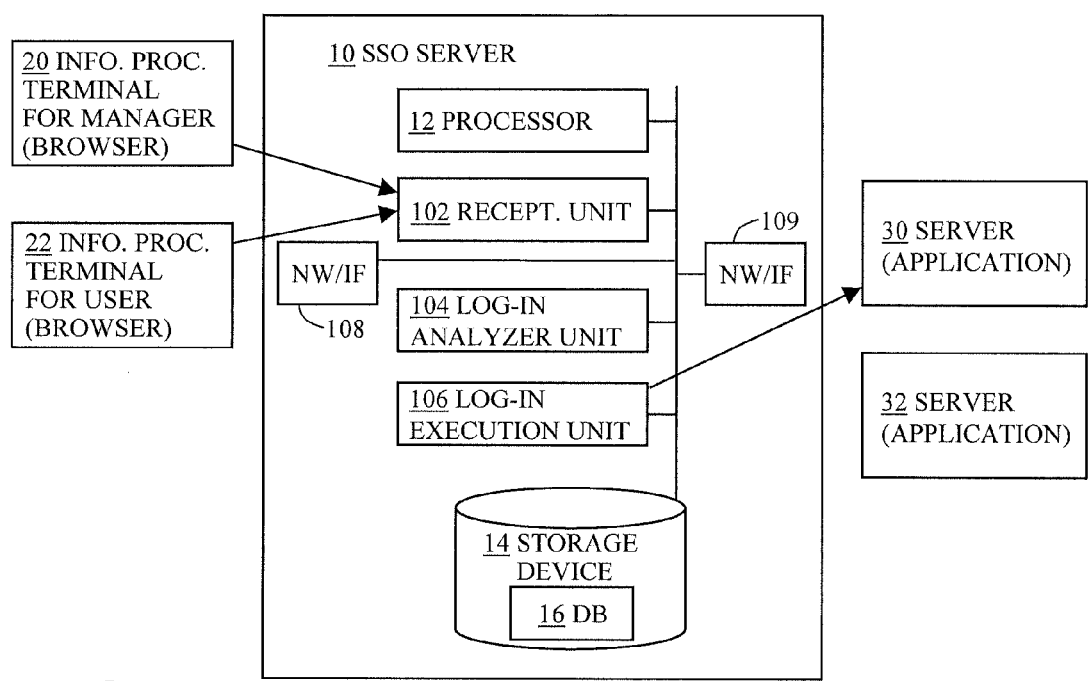
FIG. 2 illustrates an example of a schematic configuration of the single sign-on server.

FIG. 2 illustrates an example of a schematic configuration of the single sign-on server 10.

The single sign-on server 10 includes a processor 12 such as a CPU (Central Processing Unit), a storage device 14 such as a ROM, a RAM, a main storage device and an HDD (hard disk drive) having a magnetic disk, a reception unit 102, a log-in analyzer unit 104, a log-in execution unit 106, an internal bus, and network or communication interfaces (NW/IF's) 108 and 109 to be connected to the network 5. The single sign-on server 10 further includes an output device such as a display device and a printer, and a drive for reading a computer-readable recording medium. Such a computer-readable recording medium may be a portable recording medium such as a CD-ROM, a DVD disk, a USB memory, or a semiconductor memory such as a flash memory, or a magnetic disk. The storage device 14 or a computer-readable recording medium stores server programs, and the database (DB) 16, other data, and the like.

The reception unit 102, the log-in analyzer unit 104, and the log-in execution unit 106 may be implemented in a hardware form as an integrated circuit, or may be implemented in a software form as application programs which are stored in the storage device 14 and executed by the processor 12. The database 16 stores necessary data and files for the single sign-on service and for preliminary processing for the single sign-on service.

FIG. 3 illustrates an example of a table of server-specific log-in information stored in the database 16.

The table of server-specific log-in information of FIG. 3 may include or list, for example, entries as follows:

(1) a URL or URI of a top web page for a web server;
(2) a URL or URI for log-in for the web server;
(3) an authentication scheme for the web server (Form or Basic authentication);
(4) specific or unique information for authentication;
(5) a URL or URI for a request for log-in; and
(6) log-in data and information.

FIGS. 4A and 4B illustrate examples of a table of authentication information specific to a server and specific to a user and of a table of variable information specific to a web server.

The table of server-specific and user-specific authentication information of FIG. 4A may include or list, for example, entries for a combination of a particular web server identification and a particular user identification, as follows:

(1) a representative ID (identification) and a representative password, as representative authentication information;
(2) a user ID (identification) for a web server or an application; and
(3) a user password for the server or the application.

The table of server-specific variable information of FIG. 4B may include or list, for example, entries for a web server identification as follows:

(1) a provisional or parameter user ID (identification);
(2) a provisional or parameter password; and
(3) other provisional or parameter variable information.

In FIG. 4B, A provisional or parameter user ID (e.g., "uid") in a specific form, and a provisional or parameter password (e.g., "password") in a specific form represent inheritance of a user ID and a user password, respectively, as actual authentication information of FIG. 4A. The other provisional or parameter variable information of FIG. 4B corresponds to or inherits none of the entries of the authentication information of FIG. 4A, and hence the provisional "other variable information" per se of FIG. 4B may be the actual "other variable information".

FIGS. 5A and 5B illustrate examples of specific tables of server-specific log-in information of FIG. 3 for different authentication schemes (Form and Basic authentications).

The specific table of server-specific log-in information of FIG. 5A may include or list, for example, entries as follows:

(1) a URL or URI of a top web page in a web server, "http://sample.fujitsu.com/index.html";
(2) a URL or URI for log-in in the web server, "http/sample.fujitsu.com/login.html";
(3) an authentication scheme (Form or Basic authentication) in the web server, "Form";
(4) specific information for authentication in the web server, "input", "name", "user ID", "LOG_IN", "userid", "passwd", "submit", and "action";
(5) a URL or URI for a request for log-in in the web server, "http/sample.fujitsu.com/action.html"; and
(6) log-in data and information in the web server, "userid=uid, passwd=password, docID=key1".

In FIG. 5A, the values of "uid", "password", and "key1" as underlined with dashed lines are provisional or parameter variable information for log-in.

The specific table of server-specific log-in information of FIG. 5B may include or list, for example, entries as follows:

(1) a URL or URI of a top web page in a web server, "http://sample.fujitsu.com/index.html";
(2) a URL or URI for log-in in the web server, "http/sample.fujitsu.com/login.html";
(3) an authentication scheme (Form or Basic authentication) in the web server, "Basic" (i.e. Basic authentication).

The authentication scheme of "Basic" is not accompanied by other entries (4) to (6).

Figure 6A:
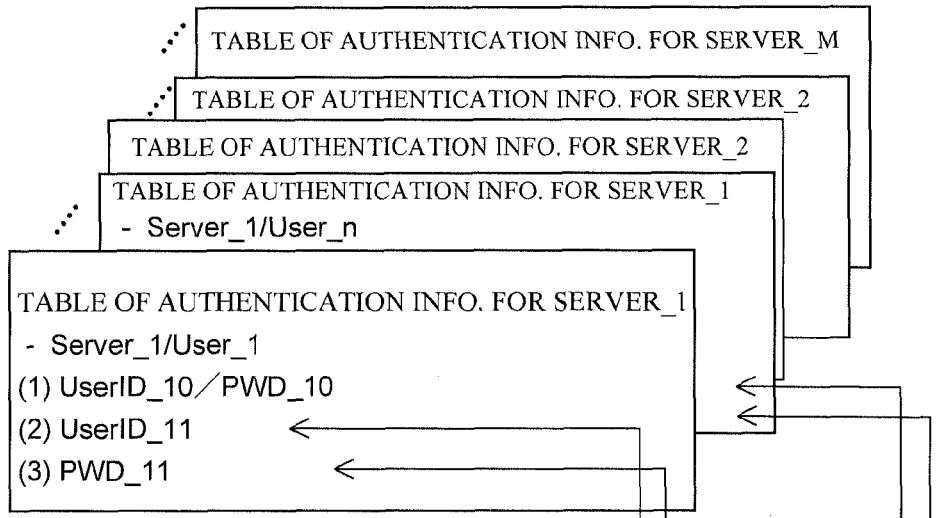
FIGS. 6A and 6B illustrate examples of a table of server-specific and user-specific authentication information and a table of server-specific variable information of FIGS. 4A and 4B.
Figure 6B:
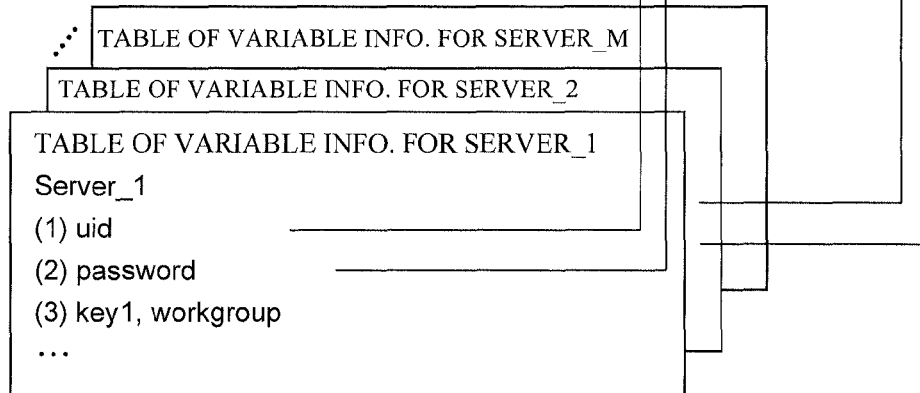

FIGS. 6A and 6B illustrate examples of a table of web-server-specific and user-specific authentication information and a table of server-specific variable information of FIGS. 4A and 4B.

The table of web-server-specific and user-specific authentication information of FIG. 6A may include or list, for example, entries for the web server identification "Server 1" and a user identification "User 1" as follows:
(1) a representative user ID, "UserID_10", and a representative password, "PWD_10";
(2) an actual user ID, "UserID_11"; and
(3) an actual user password, "PWD_11".

The specific table of server-specific variable information of FIG. 6B may include or list, for example, entries for a web server "Server_1" as follows:
(1) a provisional user ID, "uid";
(2) a provisional user password, "password; and
(3) provisional variable information, "key1, workgroup".
The provisional variable information "key1, workgroup" in the entry (3) may be ultimately the actual variable information, as described above.

FIG. 7 illustrates an example of a flow chart for processing for single sign-on in response to different requests for log-in from the information processing terminals 20-24, which is executed by the single sign-on server 10.

Referring to FIG. 7, the web browser on each of the information processing terminal 20 for a manager, and the information processing terminals 22-24 for users may first log in to the single sign-on server 10, using his or her ID and password. In accordance with operation by the manager, the web browser of the information processing terminal 20 can transmit, to the single sign-on server 10, a request for log-in to a web server for registering authentication information for single sign-on specific to the web server. The request for log-in to the web server may have a form of a URL or URI in each of the web servers 30-34. In accordance with operation by the manager, the web browser of the information processing terminal 20 transmits, to the single sign-on server 10, (1) a top web page URL or URI, and (2) a log-in web page URL or URI, of one of the web servers 30-34 or their applications.

Each of the information processing terminals 22-24 for users can transmit, to the single sign-on server 10, a request for log-in for registering authentication information for single sign-on specific to each web server, or a request for log-in to each of the web servers 30-34 or their applications. The log-in request for registering authentication information for single sign-on specific to each web server may include a URL or URI of the single sign-on server 10, and further include a user ID and a user password for use in the single sign-on server 10. The ID and the password are necessary for log-in to the single sign-on server 10. The ID and the password may be an ID and a password of the manager, or a representative ID and a representative password of the user, as preset.

At Step 302, the reception unit 102 or processor 12 of the single sign-on server 10 receives such a request for log-in. The reception unit 102 or processor 12 performs authentication of the manager or the user who is not yet authenticated. The authentication may involve use of the ID and the password of the manager, or the representative ID and the representative password of the user.

At Step 304, the log-in analyzer unit 104 or the processor 12 determines whether the request is made by the manager or one of the users. For this purpose, based on the request, the log-in analyzer unit 104 or the processor 12 may look into a URL (Referrer information) of a web page which links or is related to the request, and may determine whether the URL is used only for a log-in display screen for a manager (for example, whether the URL is a URL in a domain of the single sign-on server 10). If it is determined that the request is made by a manager and for log-in to one of the web servers 30-34, the procedure proceeds to Step 306.

At Step 306, the log-in analyzer unit 104 or the processor 12 searches the table of server-specific log-in information (FIG. 3) in the database 16, and determines whether the authentication scheme (Form or Basic authentication) in the web server 30-34 which has the URL has been registered. If it is determined that the authentication scheme has not been registered yet, the procedure proceeds to Step 422 in FIG. 8. If it is determined that the authentication scheme has been registered already, the reception unit 102 or the processor 12 at Step 308 executes other desired processing.

If it is determined at Step 304 that the request is not made by a manager but is made by a user, the log-in analyzer unit 104 or the processor 12 at Step 312 determines whether the request for log-in is for a request (or related to a URL) for registering authentication information. If it is determined that the log-in request is for registering authentication information, the procedure proceeds to Step 452 in FIG. 10. If it is determined that the log-in request is not for registering authentication information, the procedure proceeds to Step 314.

At Step 314, the log-in analyzer unit 104 or the processor 12 searches the table of server-specific log-in information (FIG. 3) in the database 16, and determines whether the authentication scheme (Form or Basic authentication) in the web server 30-34 which has the URL has been registered. If it is determined that the authentication scheme has not been registered yet, the reception unit 102 or the processor 12 at Step 316 sends an error report to the information processing terminal 22. If it is determined that the authentication scheme has been already registered, the procedure proceeds to Step 318. At Step 318, the log-in analyzer 104 or the processor 12 searches the database 16, and determines whether a representative ID and a representative password, and a user ID and a user password for the web servers 30-34 have been registered already. For this purpose, the log-in analyzer 104 or the processor 12 searches the table of server-specific and user-specific authentication information (FIG. 4A).

Figure 12A:
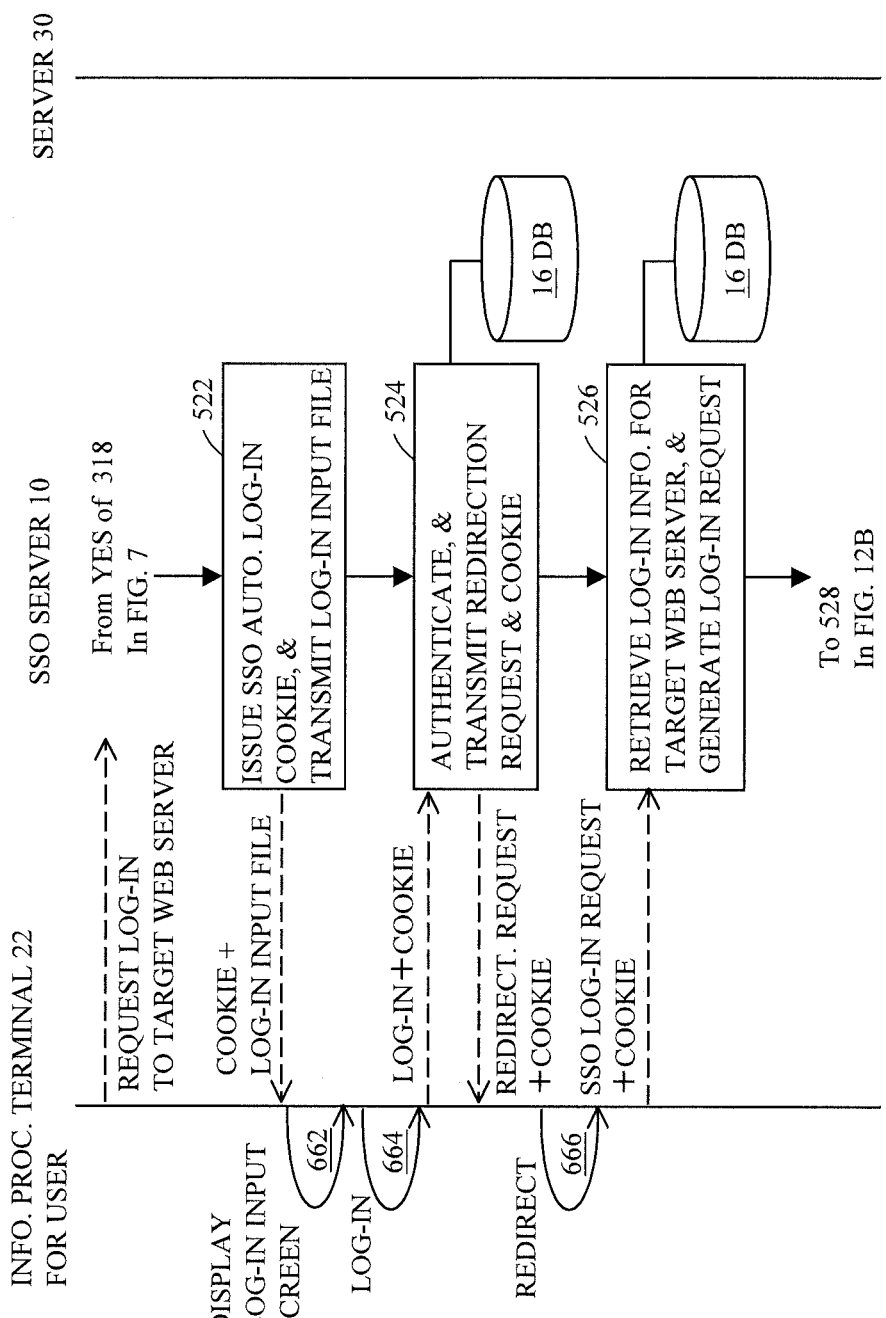
FIGS. 12A and 12B illustrate an example of a flow chart for single sign-on processing in response to a request for log-in to the web server from the information processing terminals for users, which is executed by the single sign-on server.

If it is determined at Step 318 that the user ID and the user password have been registered already, the procedure proceeds to Step 522 in FIG. 12A. If it is determined at Step 318 that the user ID and the user password have not yet been registered, the procedure proceeds to Step 452 in FIG. 10.

Figure 8:
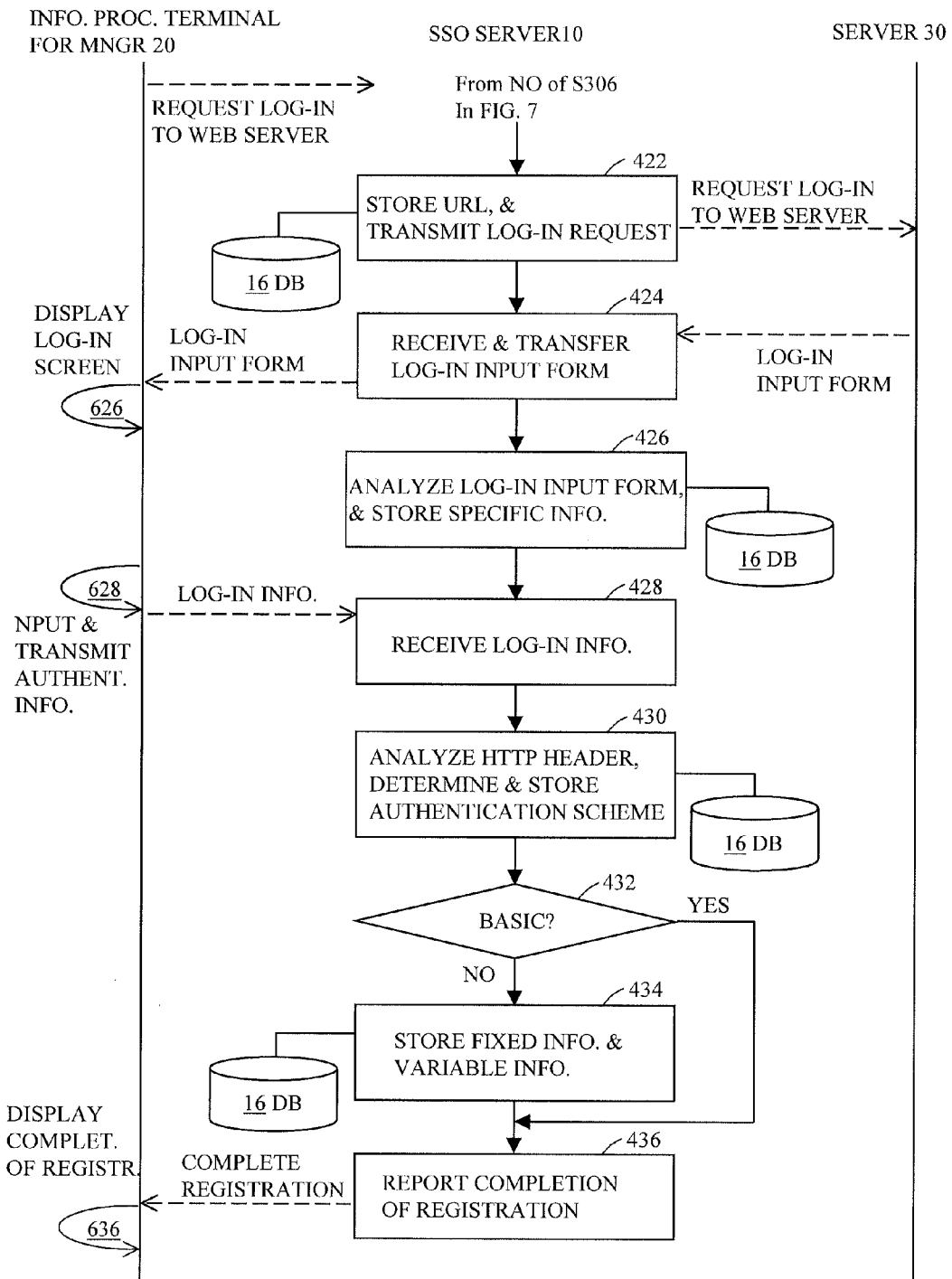
FIG. 8 illustrates an example of a flow chart for registering server-specific log-in information for single sign-on in response to a request for log-in from the information processing terminal for a manager, which is executed by the single sign-on server.

FIG. 8 illustrates an example of a flow chart for registering server-specific log-in information for single sign-on in response to a request for log-in from the information processing terminal 20 for a manager, which is executed by the single sign-on server 10.

Referring to FIG. 8, at Step 422, the log-in analyzer unit 104 or the processor 12 stores two URLs or URIs of the web server 30 in the received request, in the table of web-server-specific log-in information in the database 16 (the entries (1) and (2) in FIG. 3). The two URLs or URIs are a top web page URL or URI and a log-in web page URL or URI. The log-in analyzer unit 104 or the processor 12 uses the two URLs to transmit a request for log-in to the web server 30. In response to the log-in request, the web server 30 (or its processor) transmits a file representative of a log-in input or entry form in the HTML which corresponds to the URL back to the single sign-on server 10, and hence to the log-in execution unit 106 or the processor 12.

At Step 424, the log-in execution unit 106 or the processor 12 receives the file of a log-in input form from the web server 30, and transfers the file to the information processing terminal 20. At Step 426, the log-in analyzer unit 104 or the processor 12 analyzes the received file of a log-in input form. If possible or the authentication scheme is "Basic authentication", the log-in analyzer unit 104 or the processor 12 extracts specific information for authentication from the file of a log-in input form, and then stores the extracted specific information into the table of web-server-specific log-in information in the database 16 (entry (4) in FIG. 3). The specific information to be stored is, for example, an "input" tag, a "title" tag, a "name" tag, and their respective values of "user ID", "LOGIN", "userid", "passwd", "submit", and "action". If the authentication scheme is "Basic authentication", the specific information is not extracted.

At Step 626, the information processing terminal 20 (its web browser) receives the file of a log-in input form, and presents, on its display device, a log-in input display screen or picture represented by the received file. The manager operates the information processing terminal 20 to input and transmit pieces of log-in information including the authentication information in respective entry fields of the log-in display screen.

Figure 9:
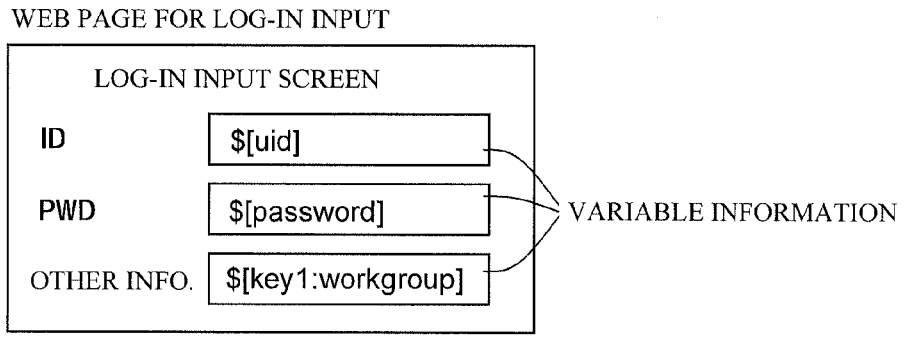
FIG. 9 illustrates an example of a log-in input display screen representative of a log-in input web page of the web server.

FIG. 9 illustrates an example of a log-in input or entry display screen representative of the log-in input or entry web page of the web server 30. The manager may input pieces of provisional login information in respective given forms which represent pieces of variable information, on the log-in input display screen of FIG. 9. The pieces of provisional log-in information may include a provisional user ID (e.g., "$[uid]"), a provisional user password (e.g., "$[password]"), and other provisional information (e.g., "$[key1:workgroup]"). For example, a form of "$[x]" (where x is a variable x) may represents a piece of provisional information x as variable information. The pieces of provisional information in the given forms inputted in the respective entry fields of the log-in input display screen are used to form a file of the inputted log-in information for transmission, so that positions of the respective different pieces of log-in authentication information as pieces of variable information can be identified within the file of log-in information. Thus, the pieces of variable information can be automatically extracted by the single sign-on server 10 from the file of log-in information. In other words, the pieces of provisional user log-in information in the given forms function as markers indicative of respective different pieces of variable authentication information and indicative of their respective positions, in the file of log-in information.

At Step 628, the information processing terminal 20 transmits, to the single sign-on server 10, the file of inputted log-in information for the URL for the log-in request. The file of the log-in information includes fixed information representative of an authentication scheme (Form or Basic authentication) and the like, and variable information which are inputted by the manager.

At Step 428, the log-in analyzer unit 104 or the processor 12 receives the file of log-in authentication information from the information processing terminal 20. At Step 430, the log-in analyzer unit 104 or the processor 12 analyzes the file of the log-in information, and determines the authentication scheme (Form or Basic authentication) and stores information of the determined authentication scheme in the table of web-server-specific log-in information (the entry (3) in FIG. 3) in the database 16. The file of the log-in information in the Basic authentication scheme includes a header for the Basic authentication ("Authorization"). The Basic authentication scheme described herein generally includes the Basic authentication scheme per se, and other similar authentication schemes such as the Digest authentication scheme for example. In addition, the Form authentication scheme described herein generally includes the Form authentication scheme per se and other similar authentication schemes.

At Step 432, the log-in analyzer unit 104 or the processor 12 determines whether or not the authentication scheme is the Basic authentication scheme. If it is determined that the authentication scheme is the Basic authentication scheme, the procedure proceeds to Step 436.

If it is determined at Step 432 that the authentication scheme is not the Basic authentication scheme or is the Form authentication scheme, the procedure proceeds to Step 434. At Step 434, the log-in analyzer unit 104 or the processor 12 analyzes the file of the log-in information, then extracts the fixed information and the variable information, and then stores the extracted information in the table of web-server-specific log-in information in the database 16 (FIGS. 3 and 6B).

The log-in analyzer unit 104 or the processor 12 extracts, as the fixed information, a URL or URI for a log-in request from the file of log-in information, and stores the extracted information in the table (the entry (5) in FIG. 3). In addition, the log-in analyzer unit 104 or the processor 12 extracts, as information including information representative of the variable information, the log-in data and information from the file of log-in information, and stores the extracted information in the table (the entry (6) in FIG. 3). For the Form authentication scheme, a URI for a log-in request may be "http://sample-.fujitsu.com/action.html", for example. The log-in data and information may be "userid=uid, passwd=password, docIID=key1", for example. In this case, the values "uid", "password" and "key1" are provisional variable information for log-in.

The log-in analyzer unit 104 or the processor 12 extracts, as the variable information, a provisional user ID, a provisional user password, and other provisional information, which are inputted by the manager, from the file of log-in information, and stores the extracted information in the table (the entries (1), (2) and (3) in FIG. 6B). The provisional user ID may be "uid", for example. The provisional user password may be "password" for example. The other provisional information may be "key1, workgroup", for example.

As described above, the log-in analyzer unit 104 or the processor 12 extracts the fixed information and the variable information in accordance with the authentication scheme. This allows identification or determination of entries of the log-in information to be transmitted to each of the web servers 30-34 and their respective entry positions in the format for a log-in request, for the user and his or her representative ID and in accordance with the authentication scheme.

At Step 436, the log-in analyzer unit 104 or the processor 12 transmits a notification of completion of registration to the information processing terminal 20. In response to reception of the notification, the information processing terminal 20 at Step 636 presents a display screen representative of the completion of the registration on the display device.

Figure 10:
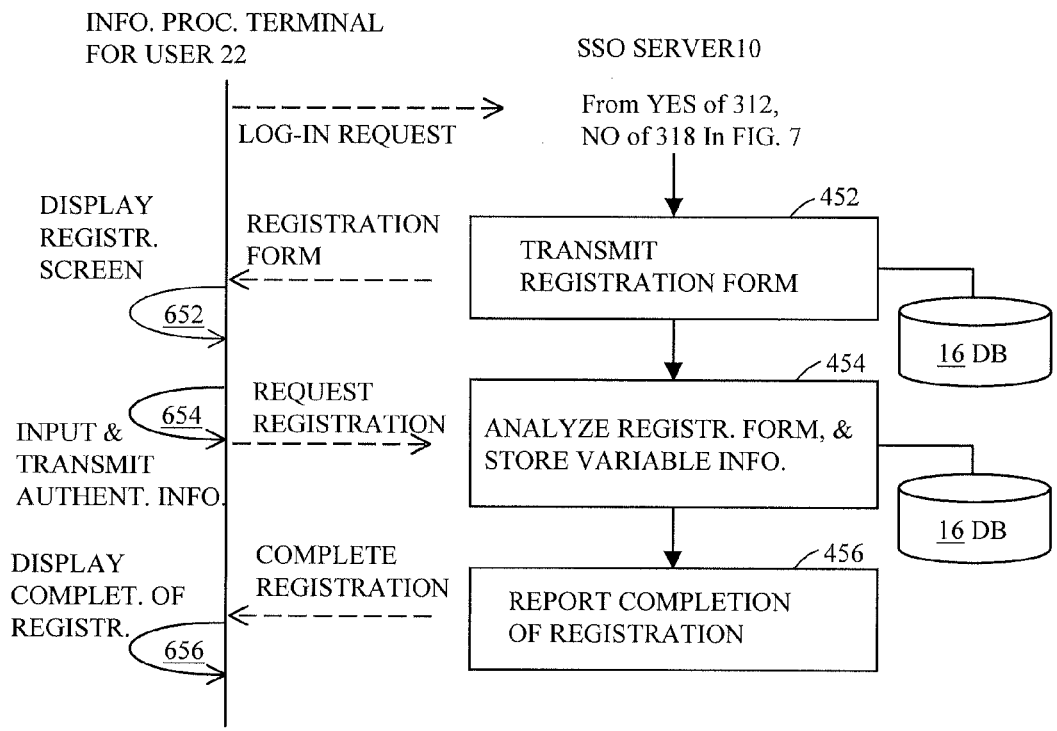
FIG. 10 illustrates an example of a flow chart for registering server-specific log-in information for single sign-on for a log-in request from the information processing terminals for users, which is executed by the single sign-on server.

FIG. 10 illustrates an example of a flow chart for registering server-specific log-in information for single sign-on for a log-in request from the information processing terminals 22-24 for users, which is executed by the single sign-on server 10.

Referring to FIG. 10, in response to the log-in request from the information processing terminal 22 for a user (FIG. 7), the log-in analyzer unit 104 or the processor 12 at Step 452 transmits the file of a form for registration in a single sign-on service. At Step 652, the information processing terminal 22 or its web browser receives the file of the form for the registration, and presents a corresponding display screen of registration in the single sign-on service on the display device. The user operates the information processing terminal 22 to input actual authentication information in the entry fields of the registration display screen and transmit the inputted information.

FIG. 11 illustrates an example of a display screen of registration in the single sign-on service. A user inputs, on the registration display screen of FIG. 11, a user name (e.g., "User_1"), a representative ID (e.g., "UserID_10"), and a representative password (e.g., "PWD_10") for the single sign-on server 10. The user also inputs a web server name (e.g., "Server_1"), and further inputs, as pieces of actual variable authentication information for each web server, a user ID (e.g., "User_11"), a user password (e.g., "PWD_11"), and other information (e.g., "Info_11").

At Step 654, the information processing terminal 22 transmits a file of the inputted registration information to the single sign-on server 10. The file of the registration information includes the variable authentication information inputted by the user, as described above.

At Step 454, the log-in analyzer unit 104 or the processor 12 analyzes the file of the registration information, and extracts the representative ID and the representative password of the user, and the user ID, the user password and other information, as actual variable authentication information for each of the web servers. The log-in analyzer unit 104 or the processor 12 stores the extracted user ID and the extracted user password in association with the extracted representative ID and each of the web servers 30-34 in the table of server-specific and user-specific authentication information (the entries (2) and (3) in FIG. 4A), and further stores the other information in the table of server-specific variable information (the entry (3) in FIG. 4B). The extraction of user-specific variable information determines authentication information and other information as the variable information in the log-in information to be transmitted to each of the web servers 30-34.

At Step 456, the log-in analyzer unit 104 or the processor 12 transmits a notification of completion of registration to the information processing terminal 22 In response to reception of the notification, the information processing terminal 22 at Step 656 presents a display screen representative of the completion of the registration on the display device.

The operation of providing inputs on the display screen of registration in the single sign-on service and transmitting a request for registration in FIG. 10 may be also performed by the manager on the information processing terminal 20, by using authentication information such as server-specific, default user ID and user password, for example.

Figure 12B:
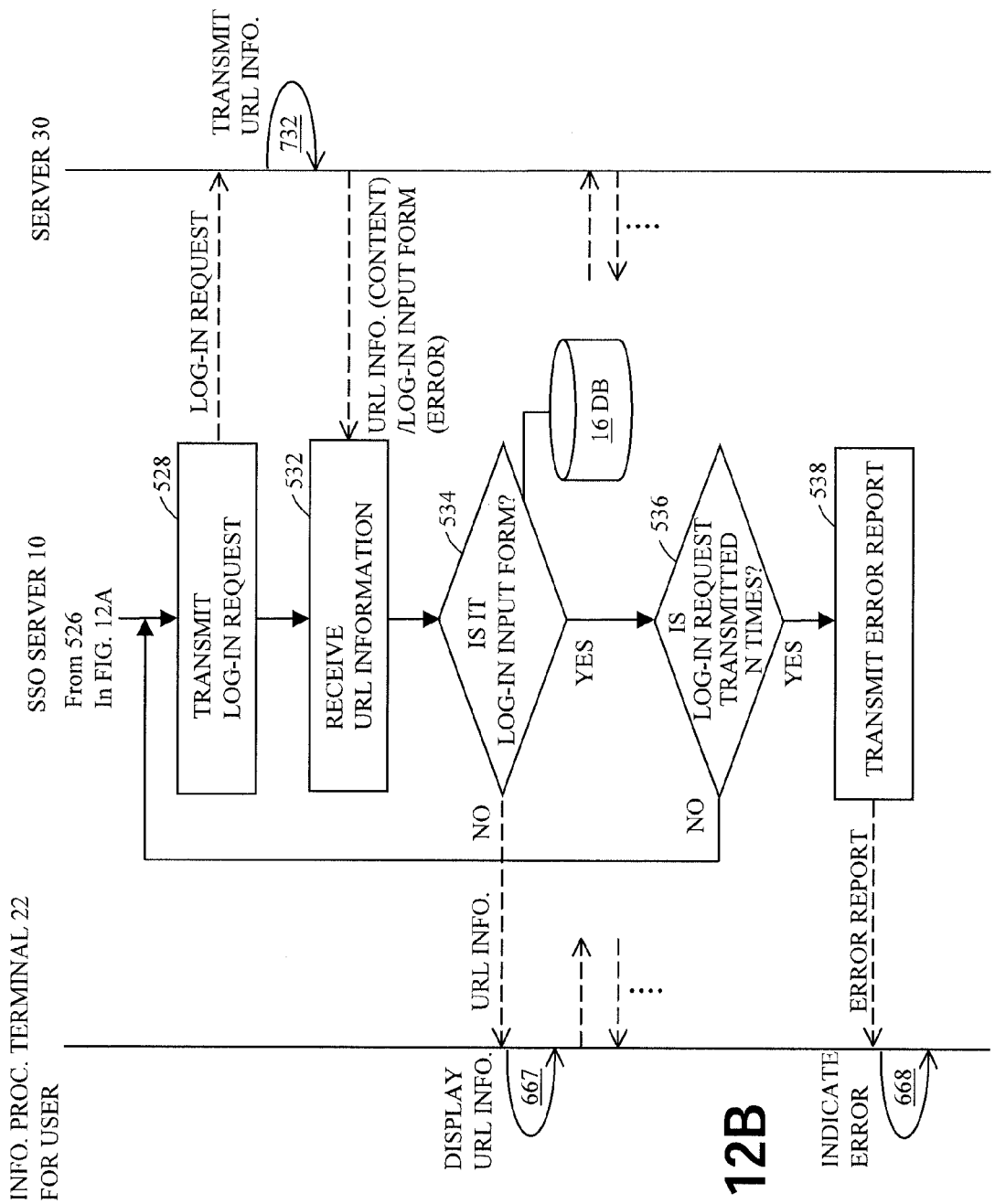

FIGS. 12A and 12B illustrate an example of a flow chart for single sign-on processing in response to a request for log-in to the web server 30 from the information processing terminals 22-24 for users, which is executed by the single sign-on server 10.

Referring to FIG. 12A, in response to a request for log-in (FIG. 7) to the web server 30 from the information processing terminal 22, the log-in execution unit 106 or the processor 12 at Step 522 transmits, to the information processing terminal 22, the file of a log-in input form together with the automatic log-in cookie for the single sign-on. The cookie is a file of a record of authentication of a user and an access to a site.

At Step 662, the information processing terminal 22 receives the log-in input file, and presents a corresponding log-in input display screen on the display device. The user operates the information processing terminal 22 or its web browser to input his or her representative ID and representative password in respective fields of the log-in input display screen. The information processing terminal 22 transmits the request for log-in including the representative ID and the representative password in the log-in display screen. At Step 664, the information processing terminal 22 transmits, to the single sign-on server 10, the log-in request including the representative ID and the representative password together with the cookie.

At Step 524, the log-in execution unit 106 or the processor 12 receives the log-in request and the cookie, and performs authentication of the user again, and transmits, to the information processing terminal 22, a request for redirecting the log-in request together with the cookie. The request for redirecting is to request the web browser of the information processing terminal 22 to transmit the request for log-in via or using the single sign-on, by changing the destination address of the single sign-on server 10 to the address of the web server 30. At Step 666, the information processing terminal 22 transmits, to the single sign-on server 10, the request for log-in via the single sign-on together with the cookie, with the destination address of the web server 30.

At Step 526, the log-in execution unit 106 or the processor 12 retrieves information representative of the authentication scheme in the web server 30, from the table of server-specific log-in information in the database 16 (the entry (3) in FIGS. 3, 5A and 5B). The log-in execution unit 106 or the processor 12 may retrieve specific information for authentication, a URL for a request for log-in, and information of log-in data and information, from the table of server-specific login information (the entries (4)-(6) in FIGS. 3, 5A, and 5B), if necessary. The log-in execution unit 106 or the processor 12 then retrieves a user ID and a user password for the web server 30, from the table of server-specific and user-specific authentication information (the entries (2) and (3) in FIGS. 4A and 6A). The log-in execution unit 106 or the processor 12 then retrieves a provisional user ID, a provisional user password and other provisional information for the web server 30, from the table of server-specific variable information in the database 16 (the entries (1)-(3) in FIGS. 4B and 6B). The log-in execution unit 106 or the processor 12 organizes the retrieved information in accordance with the authentication format, and generates a request for log-in to be transmitted to the web server 30.

In the Form authentication scheme, for example, "userid=UserID_11" is substituted for the user ID "userid=uid" (the entry (6) in FIG. 5A) in the log-in information (http://sample.fujitsu.com/action.html) based on the table of variable information (the entry (1) in FIG. 6B). For this purpose, the actual user ID in the table of authentication information (the entry (2) in FIG. 6A) is substituted instead of the provisional ID. In addition, for example, "passwd=PWD_11" (the entry (3) in FIG. 6A) is substituted for the user password "passwd=password" (the entry (6) in FIG. 5A) in the log-in information based on the table of variable information (the entry (2) in FIG. 6B). For this purpose, the actual user password in the table of authentication information (the entry (3) in FIG. 6A) is referenced to, instead of the provisional user password. Further, for example, "docID=key1, workgroup" (the entry (3) in FIG. 6B) is substituted for the other information "docID=key1" (the entry (6) in FIG. 5A) in the log-in information, referencing to the table of variable information (the entry (3) in FIG. 6B). In this case, the provisional information is used as the actual information, because there is no other information in the authentication information to be substituted for the other provisional information.

In the Basic authentication scheme, for example, the user ID "UserID_11" (the entry (2) in FIG. 6A) and the user password "PWD_11" (the entry (3) in FIG. 6A) are encoded as authentication information based on the table of variable information (the entries (1) and (2) in FIG. 6B), and then placed at the known positions in the header "Authorization" in the log-in information.

Referring to FIG. 12B, the log-in execution unit 106 or the processor 12 at Step 528 transmits the generated request for log-in over the network 5 to the web server 30. At Step 732, the web server 30 receives the request for log-in and transmits corresponding URL information. If the log-in authentication is successful, the web server 30 transmits, in response, corresponding URL information such as information content back to the single sign-on server 10. If the log-in authentication is unsuccessful, the web server 30 transmits the file of the log-in input form back to the single sign-on server 10 so as to indicate a log-in error and prompt a further log-in operation.

At Step 532, the log-in execution unit 106 or the processor 12 receives the file of the URL information. At Step 534, the log-in execution unit 106 or the processor 12 looks into the specific information for authentication and information of the authentication scheme (Basic authentication) in the database 16 (the entries (4) and (3) in FIG. 3), and determines whether the received URL information represents the log-in input form. In the Basic authentication scheme, the file of the log-in input form includes a header for the Basic authentication "Authorization". In the Form authentication scheme, the file of the log-in input form includes specific information for authentication. If it is determined that it is not representative of the log-in input form, the log-in execution unit 106 or the processor 12 transfers the file of the URL information to the information processing terminal 22. Thus, the single sign-on server 10 provides the information processing terminals 22-24 with its single sign-on service. At Step 667, the information processing terminal 22 may present or display the received URL information. After that, different URL information may be transmitted and received between the information processing terminal 22 and the web server 30 in a normal manner.

If it is determined at Step 534 that the URL information is representative of the log-in input form, the log-in execution unit 106 or the processor 12 at Step 536 determines whether it has received the file of log-in input form for N times or more, where N may be a pre-defined fixed value or number. If it is determined that it has received the file for less than N times, the procedure returns to Step 528. At Step 528, the log-in execution unit 106 or the processor 12 attempts to again execute log-in to the web server 30. If it is determined that it has received the file for N times or more, the log-in execution unit 106 or the processor 12 at Step 538 transmits a notification of a log-in error to the information processing terminal 22. At Step 668, the information processing terminal 22 indicates a log-in error on its display device.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A server apparatus comprising:
a storage device; and
an analyzer unit to analyze log-in information received from a client, determine an authentication scheme used for the log-in information, extract, from the log-in information, first authentication information in a particular form, store, in the storage device, information indicative of the authentication scheme and the first authentication information, and store, in the storage device, second authentication information of a user as substitute for the first authentication information, wherein the first authentication information is a marker of a position in the log-in information at which the second authentication information is to be inserted, and the second authentication information is associated with third authentication information of the user for log-in to another server and is used for log-in to the another server.

2. The server apparatus according to claim 1, further comprising a log-in execution unit to retrieve, in response to reception of a request for log-in to the another server from another client by authenticating the third authentication information, the information indicative of the authentication scheme, the first authentication information, and the second authentication information of the user, from the storage device, and generate the request for log-in to the another server by using the second authentication information of the user in accordance with the authentication scheme.

3. The server apparatus according to claim 1, wherein the analyzer unit extracts the second authentication information from a request for registration of authentication information received from another client.

4. The server apparatus according to claim 2, wherein the analyzer unit further extracts fixed information from the log-in information and stores the extracted fixed information in the storage device; and
the log-in execution unit retrieves the fixed information from the storage device and generates a request for log-in to the another server by using the fixed information and the second authentication information in accordance with the authentication scheme.

5. The server apparatus according to claim 3, wherein, before reception of the request for registration of authentication information, the analyzer unit transmits, to the other client, information used to generate a registration display screen for entry of the second authentication information for log-in to the another server.

6. The server apparatus according to claim 1, wherein, before reception of the request for registration of authentication information, the analyzer unit transfers, to another client, information used to generate a display screen of log-in and received from the another server, and analyzes the information used to generate the display screen of log-in; and
if fixed information for authentication is included in the information used to generate the display screen of log-in, the analyzer unit extracts the fixed information for authentication and stores the extracted fixed information in the storage device.

7. A computer-readable, non-transitory medium storing a program that causes a computer to execute a process, the process comprising:
analyzing log-in information received from a client;
determining an authentication scheme used for the log-in information;
extracting, from the log-in information, first authentication information in a particular form;

storing, in the storage device, information indicative of the authentication scheme and the first authentication information; and storing, in the storage device, second authentication information of a user as substitute for the first authentication information, wherein the first authentication information is a marker of a position in the log-in information at which the second authentication information is to be inserted, and the second authentication information is associated with third authentication information of the user for log-in to the another server and is used for log-in to the another server.

8. The computer-readable, non-transitory medium according to claim 7, wherein the process further comprises retrieving, in response to reception of a request for log-in to the server from another client by authenticating the third authentication information, the information indicative of the authentication scheme, the first authentication information, and the second authentication information of the user, from the storage device, and further comprises generating a request for log-in to the server by using the second authentication information of the user in accordance with the authentication scheme.

9. The computer-readable, non-transitory medium according to claim 7, wherein the process further comprises extracting the second authentication information from a request for registration of authentication information received from another client.

10. The computer-readable, non-transitory medium according to claim 8, wherein the process further comprises extracting fixed information from the log-in information and storing the extracted fixed information in the storage device, and further comprises retrieving the fixed information from the storage device and generating a request for log-in to the server by using the fixed information and the second authentication information in accordance with the authentication scheme.

11. The computer-readable, non-transitory medium according to claim 9, wherein the process further comprises transmitting, to the other client, information used to generate a registration display screen for entry of the second authentication information for log-in to the server, before reception of the request for registration of authentication information.

12. The computer-readable, non-transitory medium according to claim 7, wherein the process further comprises transferring, to another client, information used to generate a display screen of log-in and received from the server, and analyzing the information used to generate the display screen of log-in, before reception of the request for registration of authentication information, and further comprises extracting fixed information for authentication from the information used to generate the display screen of log-in and storing the extracted fixed information in the storage device, if the fixed information for authentication is included in the information used to generate the display screen of log-in.

\* \* \* \* \*